E. PARKER.
Gear Cutter.

No. 56,149.

Patented July 3, 1866.

UNITED STATES PATENT OFFICE.

EDWARD PARKER, OF MIDDLETOWN, CONNECTICUT, ASSIGNOR TO HIMSELF AND JULIUS HOTCHKISS, OF SAME PLACE.

IMPROVED GEAR-CUTTER.

Specification forming part of Letters Patent No. 56,149, dated July 3, 1866.

*To all whom it may concern:*

Be it known that I, EDWARD PARKER, of Middletown, in the county of Middlesex and State of Connecticut, have invented a new and Improved Gear-Cutter; and I do hereby declare that the following is a full, clear, and exact description thereof, which will enable others skilled in the art to make and use the same, reference being had to the accompanying drawings, forming part of this specification, in which—

Figure 3:
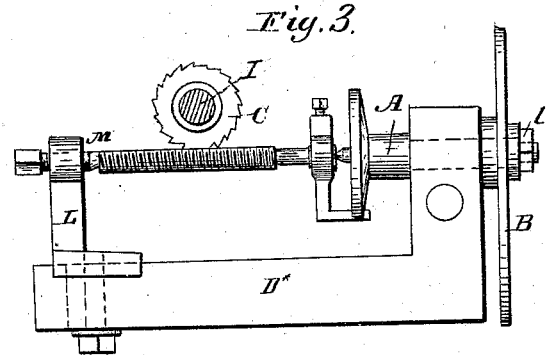
Figure 2:
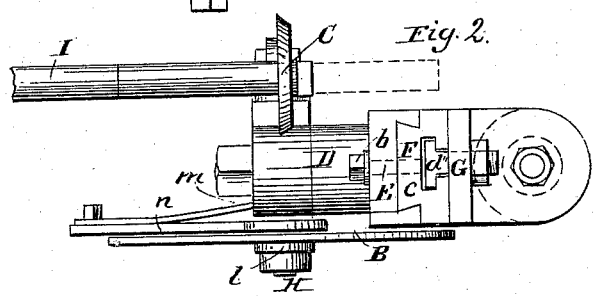
Figure 1:
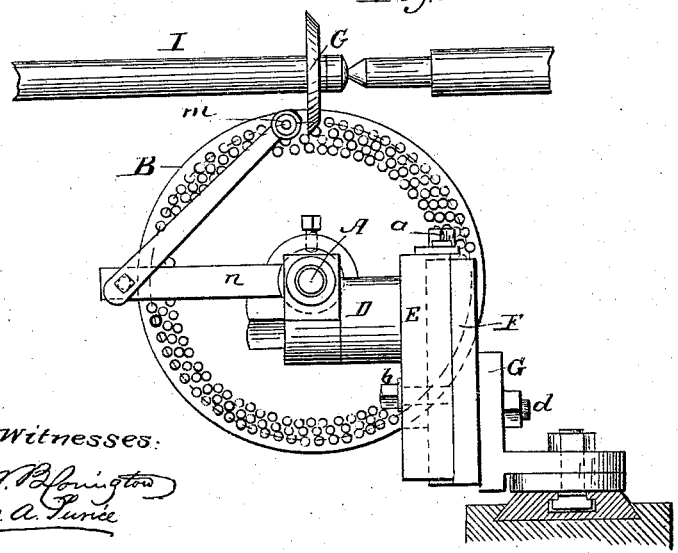

Figure 1 represents a front elevation of this invention. Fig. 2 is a plan or top view of the same. Fig. 3 is a side elevation of the same when applied for cutting longitudinal grooves in taps and other articles.

Similar letters of reference indicate like parts.

This invention relates to a gear-cutter which is so constructed that it can be applied to the slide-rest in place of the tool-stock or tool-holder, and that it can be adjusted for cutting square or bevel gear, and also for cutting grooves in taps or other articles of a similar nature.

A represents the spindle or arbor, to one end of which the division-plate B is secured, while on its other end the blank is attached which is to be exposed to the action of the cutter C. Said arbor has its bearings in a head, D, which is secured to a slide, E, and this slide moves back and forth on a bed-plate, F, being adjusted by a screw-spindle, *a*, and secured in the desired position by a set-screw, *b*.

The bed-plate F is provided on its under surface with a double-flanged groove, *c*, to receive the T-head of a screw, *d*, which is secured in a bracket, G. This bracket is fastened to the slide-rest of an ordinary engine-lathe in place of the tool-holder, and it may be made in two parts, which are fitted together, as shown in Fig. 1 of the drawings, so that the arbor A can be conveniently adjusted in any desired position.

The cutter C is secured to a mandrel, I, which runs between the centers of the lathe, and to which a revolving motion is imparted by the belt which serves to give motion to the lathe-spindle.

By means of the T-headed screw $d''$ and the pivoted bracket D the bed-plate F, with the slide E and head D, can be brought in any desired position, so that the arbor carrying the blank to be cut can be adjusted for square or bevel gearing, or for teeth or cogs of any desired description. The head D, which forms the bearing for the arbor A, can be replaced by a head, D*, such as shown in Fig. 3, said head being provided with a hole, $d^*$, to admit the same bolt which serves to fasten the head D to the slide E, and with an adjustable slide or secondary head, L, carrying a center point, M. In this case the inner end of the arbor A is also provided with a center point, and on said arbor is mounted a small face-plate, so that a tap or other article can be conveniently secured in the head D* and exposed to the action of the cutter for the purpose of cutting in its surface longitudinal grooves of any desired depth and shape.

The division-plate B is held firmly in position by the nut *l*, and it serves to turn the arbor A for the desired distance after a tooth or groove has been cut. Said plate is perforated with a large number of holes, and it is arrested in the desired position by a spring-point, *m*, the spring of which is secured to an arm, *n*, extending from the head D or D*.

By these means a gear-cutter is obtained which can be readily attached to a slide-rest of an ordinary turning-lathe, and which serves for cutting square and bevel gear-taps and other articles with equal facility.

What I claim as new, and desire to secure by Letters Patent, is—

The pointed bracket G, in combination with the bed-plate F, slide E, with head D or D*, and arbor A, constructed substantially as and for the purpose described.

EDWARD PARKER.

Witnesses:
C. A. HOTCHKISS,
CHAS. G. R. VINERE.